United States Patent Office 3,039,001
Patented June 12, 1962

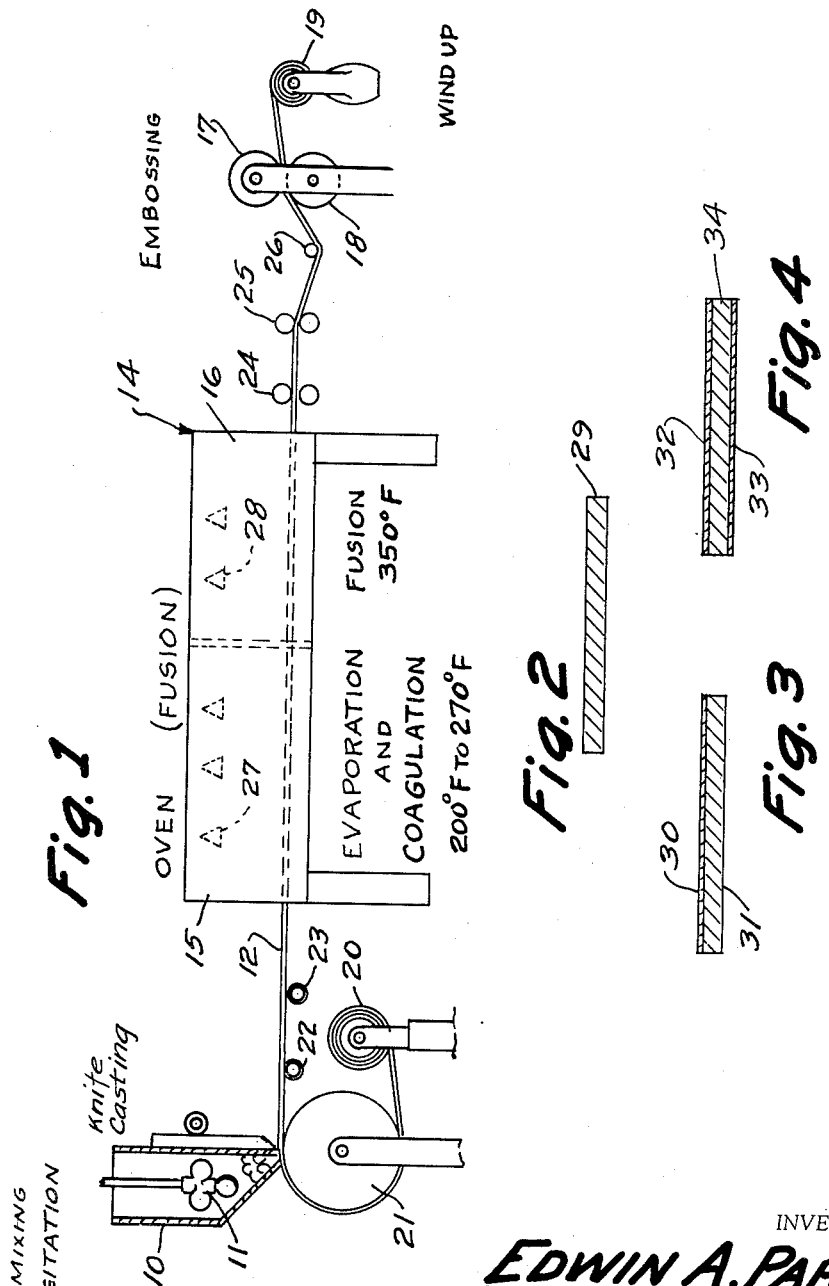

3,039,001
FLEXIBLE PROTECTIVE PLASTIC SHIELD
Edwin A. Park, Inwood, and Charles B. Kamiss, Jamaica, N.Y., assignors to Neolon Corporation, Inwood, N.Y.
Filed May 15, 1959, Ser. No. 813,510
8 Claims. (Cl. 250—108)

This invention relates to a protective vinyl film, or sheet of material, such as may be used in wearing apparel of X-ray technicians, or as a screen or barrier, and in particular a vinyl or other plastic film or sheet of material containing resin, plasticiser and stabilizer, with a protective material, such as pulverized lead uniformly distributed therethrough, and which may also contain a pigment that may also be uniformly distributed through the film or provided on one or both sides thereof; whereby a flexible protective film or sheet of material is provided which when used as wearing apparel protects the wearer against X-rays, gamma rays, neutron rays, secondary cosmic rays, and the like.

This application is a continuation in part of a former application of Charles B. Kamiss, for an Electromagnetically Oriented X-Ray Screening Diaphragm, filed November 17, 1952, with the Serial No. 320,858, now abandoned.

The purpose of this invention is to provide a flexible film barrier for radiation which is designed to be used as a shield or screen, or as sheeting in wearing apparel.

The value of lead as a protective shield against X-rays, gamma rays, secondary cosmic rays, and the like has been recognized for many years, however, it has always been considered necessary to use the lead in sheet form and this necessitates a sheet of material, such as lead, in combination with supporting sheets or layers of material, and a plurality of laminated layers of material does not provide sufficient flexibility for use as sheeting in wearing apparel.

There is a product on the market generally referred to as leaded rubber, however, because of the very nature of rubber a very rapid rate of oxidation occurs in such products.

Furthermore, rubber is affected by ozone which results in leaks and tiny cracks in the sheeting, so that in the early stages of ozone cracking the sheet develops numerous tiny cracks, invisible to the eye, and such cracks allow leakage of deleterious rays.

Another important factor is the fact that rubber can not be fused either electronically or thermally. Therefore, in making gloves, aprons, or any other type of wearing apparel from the leaded rubber product it is necessary to sew the parts together and then adhere strips of the same material over the seams. This often results in leakage of rays at the joints as the adhesive loosens with age and by flexation.

Another important point is that rubber by its very nature can not be plasticized such as is required in making really flexable wearing apparel, or for all practical purposes to the extent that vinyl sheeting may.

With these thoughts in mind this invention contemplates a vinyl film or sheet of material having a resin base with plasticiser and stabilizer in combination therewith and in which pulverized lead is uniformly distributed throughout the material, thereby providing a sheet of material having sufficient flexibility for use in wearing apparel.

The object of this invention is, therefore, to provide a flexible film or sheet of material that provides a shield or protection against X-rays, gamma rays, neutron rays, and secondary cosmic rays.

Another object of the invention is to provide a film or sheet of material that is impervious to X-rays, gamma rays, neutron rays, secondary cosmic rays, and the like, in which the film or sheet of material has sufficient flexibility to be used for wearing apparel.

Another important object of the invention is to provide a film or sheet of material including vinyl plastic with pulverized lead uniformly distributed therethrough in which the film or sheet of material is not subject to cracking.

A further object of the invention is to provide a film or sheet of material of vinyl plastic or other plastic material including resin, plasticiser, and stabilizer, in which pulverized lead is uniformly distributed throughout the film or sheet of material in which the complete film is incorporated in a single sheet of material, or a multiple of sheets, for extra flexibility, such as in gloves, hoods, and the like.

A still further object of the invention is to provide a vinyl film or other plastic film or sheeting which by including pulverized lead in abundance is impervious to X-rays, gamma rays, secondary cosmic rays, and the like, in which a pigment may be incorporated in the body of the film, or included on one or both sides thereof.

And a still further object is to provide a plastic film or sheet of material which, having pulverized lead in combination with resin, plasticiser and stabilizer cast therein is impervious to X-rays, gamma rays, secondary cosmic rays, and the like, and is sufficiently flexible to be used for sheeting of wearing apparel, and which may include a pigment or pigments, in which the film or sheeting is simple and economical to manufacture.

With these and other objects and advantages in view the invention embodies a flexible vinyl plastic film or sheet of material, such as Neopaque, including resin, plasticiser such as diethylhexyl phthalate, stabilizer such as lead stearate, and pulverized lead. The Neopaque may also include a pigment and the pigment may be incorporated in the film or may be on one or both sides thereof.

Other features and advantages of the invention will appear from the following description taken in connection with the drawings, wherein:

FIGURE 1 is a diagrammatic view illustrating a method or process of casting and embossing the film or sheet of material.

FIGURE 2 is a section of a film or sheet of material which may be cast with or without a pigment, as may be desired.

FIGURE 3 is a section of a film or sheet of material in which a pigment is provided on one side of a flexible vinyl plastic film.

FIGURE 4 is a section similar to that shown in FIGURE 3 in which a pigment is provided on both sides of the film.

Referring now to the drawing wherein like reference characters denote corresponding parts the process of making the Neopaque film or sheet of material of this invention includes a hopper 10 having an agitator 11 for continuously mixing the materials, a band 12 on which the film or sheet of material is cast, a knife 13 for regulating the thickness of the film, an oven 14 having a section 15 for evaporation and coagulation and a section 16 for fusion, embossing rolls 17 and 18 and a rewinding roll 19.

The band 12 extends from a storage roll 20 around a roll 21, below the hopper 10 and over rolls 22 and 23 into the evaporation and coagulation chamber 15 of the oven 14 and through the fusion section or chamber 16 from which the film passes through pairs of rolls 24 and 25 and under roll 26 to the embossing rolls 17 and 18, after which the film is separated from the band, and the band is rolled on the rewinding roll 19. In the oven the film is subjected to burners 27 in the section 15 and 28 in the section 16.

As illustrated in FIGURE 2 a pigment may be incorporated in the body of the film or sheet of material, which is indicated by the numeral 29, or a pigment layer 30 may be positioned on one side of a film 31, as shown in FIGURE 3, or pigment layers 32 and 33 may be provided on both sides of a film 34, as shown in FIGURE 4. Pulverized lead may or may not be included in the pigment layers, as may be desired.

As an example, layers of the product up to ten mils in thickness are referred to as film, and layers over ten mils are referred to as sheeting.

As an example, the film, or sheet of material contains resin, plasticiser, such as diethylhexyl, stabilizer, such as lead stearate, and pulverized lead.

Although the proportion of the different ingredients are not important it is preferred to use lead pulverized to a screen of from 200 to 225 mesh, and the quantity of pulverized lead is approximately 25% by volume, or 65% by weight.

The distinctive characteristics of the protective shield of this invention are in the fact that the material contains a relatively large quantity of powdered lead, and although the quantity is specified as being approximately 25% it will be understood that from 35% to 45% of powdered lead, by volume, may be used.

The protective shield of this invention provides an integrated laminous shielding film comprising a flexible plastic layer of material having 25% to 45% of pulverized lead providing a ray-blocking material evenly distributed therethrough.

Lead stearate stabilizes against heat, light, and oxidation. Lead is present in abundance in the film or sheet of material, and stearate is a fatty acid. The plasticiser used in the film or sheet of material is also a fatty acid so that by its very nature the material provides added fortification against heat, and light, and oxidation is provided.

A pigment may be incorporated in the body of the film, as indicated in FIGURE 2, or the pigment may be used on one side as shown in FIGURE 3, or on both sides, as shown in FIGURE 4.

The film or sheet of material may be embossed before being stripped from the band by running it through embossing rolls, and it may be cast directly on one or both sides of fabric.

In casting the film or sheet of material the pulverized lead is dispersed throughout the compounds by continuously agitating the compounds in the hopper 14, so that the compound, wet or dry, is uniformly dispersed throughout the film, regardless of whether the film is formed by casting, calendering, or molding.

The improved vinyl plastic film is particularly useful in making wearing apparel, and can be used for other protective purposes.

The plasticiser is adjusted to control flexibility, and by this means a flexible film is provided wherein one part in the thickness or gage may contain pulverized lead as a protection against gamma rays and neutron rays.

An outer layer of the film or sheet of material may contain only a pigment for color and may not include pulverized lead or the like.

It will be understood that modifications, within the scope of the appended claims may be made in the design and arrangement of the parts without departing from the spirit of the invention.

What is claimed is:

1. A flexible plastic non-porous film or sheet of material including resin, diethylhexyl phthalate, providing a plasticiser, lead stearate providing a stabilizer, and 25% to 45% pulverized lead evenly distributed throughout the film.

2. In a protective shield, the combination which comprises a flexible vinyl plastic film including resin, a binder for retaining the particles in assembled relation, a plasticiser for making the film pliable, and an X-ray intercepter comprising 25% by volume of pulverized lead uniformly distributed throughout the area of the shield.

3. A protective shield as described in claim 2, wherein at least one surface of the film is provided with a pigment for color.

4. A flexible plastic material, fine powdered lead evenly distributed throughout said flexible plastic material, said flexible plastic material including layers fused together to provide a homogeneous mass, and an outer layer having a pigment therein fused to at least one side of said flexible plastic material, whereby the layer with the pigment therein functions as a single plastic flexible sheet of material in combination with said leaded layers.

5. A method for making flexible radiation opaque sheeting including vinyl resin, plasticiser, and powdered lead mixed in a ratio of between 35% to 45% lead equivalent, whereby, per example, a finished sheet of .100 inch thick will have a lead content equivalent to a lead sheet of .035 to .045 inch thick, said mixture being distributed over a web of woven heat resistant material and said web becomes integral part of said sheeting for added strength, and run through heated oven for curing said sheeting and said sheeting being assembled layer upon layer to obtain the desired thickness, thereby providing a sheeting of uniform homogeneity.

6. A method for making flexible radiation opaque sheeting including vinyl resin, plasticizer, and powdered lead mixed in a ratio of between 35% to 45% lead equivalent, whereby, per example, a finished sheet of .025 inch thick will have a lead content equivalent to a lead sheet of .00875 to .01125 inch thick, said mixture being spread over a suitable web of paper or foil and run through a heated oven for curing said sheeting, and after the desired thickness obtained, the finished sheeting is stripped from the carrier web.

7. In a protective shield, the combination which comprises a flexible vinyl plastic film, including resin, a binder for retaining particles of the film in assembled relation, a plasticiser for making the film pliable, and lead powder as an X-ray opaque material including 25% to 45% of sheet lead equivalent uniformly distributed throughout the film.

8. A protective shield as described in claim 7, in which a color layer is provided on at least one side of the film for appearance.

References Cited in the file of this patent

UNITED STATES PATENTS

| | | |
|---|---|---|
| 2,162,178 | Marasco et al. | June 13, 1939 |
| 2,404,225 | Green | July 16, 1946 |
| 2,405,987 | Arnold | Aug. 20, 1946 |
| 2,494,664 | Lubow | Jan. 17, 1950 |
| 2,796,411 | Zirkle et al. | June 18, 1957 |
| 2,796,529 | Morrison | June 18, 1957 |
| 2,845,660 | Peiler | Aug. 5, 1958 |
| 2,928,948 | Silversher | Mar. 15, 1960 |

FOREIGN PATENTS

| | | |
|---|---|---|
| 513,838 | Great Britain | 1939 |
| 703,153 | Great Britain | Jan. 27, 1954 |
| 317,136 | Switzerland | Dec. 29, 1956 |

OTHER REFERENCES

Levy, Abstract 49,649, published in vol. 665, pp. 1314–15 of the Official Gazette, Dec. 23, 1952.